US010565664B2

(12) United States Patent
Coronel et al.

(10) Patent No.: US 10,565,664 B2
(45) Date of Patent: Feb. 18, 2020

(54) CONTROLLING ACCESS TO A VAULT SERVER IN A MULTITENANT ENVIRONMENT (71) Applicant: INTERNATIONAL BUSINESS MACHINES CORPORATION, Armonk, NY (US)

(72) Inventors: Jose R. D. Coronel, Poughkeepsie, NY (US); Victor R. Herrero, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 15/175,320

(22) Filed: Jun. 7, 2016

(65) Prior Publication Data

US 2017/0353456 A1 Dec. 7, 2017

(51) Int. Cl.
G06F 21/45 (2013.01)
G06Q 50/10 (2012.01)
G06F 21/31 (2013.01)

(52) U.S. Cl.
CPC .................... G06Q 50/10 (2013.01)

(58) Field of Classification Search
None
See application file for complete search history.

(56) References Cited

U.S. PATENT DOCUMENTS

| 7,519,987 | B1 | 4/2009 | Holt et al. | |
| 2014/0075565 | A1* | 3/2014 | Srinivasan | G06Q 10/06315 726/26 |
| 2014/0181517 | A1* | 6/2014 | Alaranta | H04L 63/062 713/168 |
| 2014/0298432 | A1 | 10/2014 | Brown | |

(Continued)

FOREIGN PATENT DOCUMENTS

| WO | 0033206 | 6/2000 |
| WO | 2015100475 | 7/2015 |
| WO | 2015109172 | 7/2015 |

OTHER PUBLICATIONS

Securing sensitive data with Azure Key Vault. Kerekhove, Tom. (Year: 2015).*

(Continued)

Primary Examiner — Venkat Perungavoor
(74) Attorney, Agent, or Firm — William Hartwell; Andrew D. Wright; Roberts Mlotkowski Safran Cole & Calderon P.C.

(57) ABSTRACT

A computer-implemented method includes: receiving, by a computing device, a vault access request for vault credentials stored by a vault server; verifying, by the computing device, whether a source of the vault access request originated from a multitenant application server; preventing, by the computing device, access to the vault server and the vault credentials when the source of the vault access request has not been verified as originating from the multitenant application server; obtaining, by the computing device, vault credentials from a vault server based on verifying that the (Continued)

source of the vault access request originated from the multitenant application server; and executing, by the computing device, a multitenant application task using the vault credentials.

20 Claims, 6 Drawing Sheets

(56) References Cited

U.S. PATENT DOCUMENTS

| | | |
|---|---|---|
| 2015/0347734 A1 | 12/2015 | Beigi |
| 2016/0057110 A1 | 2/2016 | Li et al. |
| 2016/0099915 A1* | 4/2016 | Savelieva ........... H04L 63/0428 726/15 |
| 2016/0352527 A1* | 12/2016 | Satoh ..................... H04L 9/006 |

OTHER PUBLICATIONS

Multi-Tenant SOA Middleware for Cloud Computing. Azeez et al. (Year: 2010).*

Next Generation Multi-Tenant Virtualization Cloud Computing Platform. Siddhisena et al. ICACT (Year: 2011).*

Trusted Computing Strengthens Cloud Authentication. Ghazizadeh et al. The Scientific World Journal. (Year: 2014).*

Zhang et al., "The Design of Fingerprint Vault Based IC Card Access Control System", Wireless and Optical Communications, Feb. 15-17, 2016, p. 172-175, 4 Pages.

Mell et al., "The NIST Definition of Cloud Computing", NIST, Special Publication 800-145, Sep. 2011, 7 pages.

* cited by examiner

CONTROLLING ACCESS TO A VAULT SERVER IN A MULTITENANT ENVIRONMENT

BACKGROUND

The present invention generally relates to controlling access to a vault server and, more particularly, to controlling access to a vault server residing on a client network outside of a service provider network in a multitenant environment.

Software multitenancy is a software architecture in which a single instance of software runs on a server and serves multiple tenants. A tenant is a group of users who share a common access with specific privileges to the software instance. With a multitenant architecture, a software application (e.g., a multitenant application) is designed to provide every tenant a dedicated share of the instance—including its data, configuration, user management, tenant individual functionality and non-functional properties.

SUMMARY

In an aspect of the invention, a computer-implemented method includes: receiving, by a computing device, a vault access request for vault credentials stored by a vault server; verifying, by the computing device, whether a source of the vault access request originated from a multitenant application server; preventing, by the computing device, access to the vault server and the vault credentials when the source of the vault access request has not been verified as originating from the multitenant application server; obtaining, by the computing device, vault credentials from a vault server based on verifying that the source of the vault access request originated from the multitenant application server; and executing, by the computing device, a multitenant application task using the vault credentials.

In an aspect of the invention, there is a computer program product for controlling access to a vault server and vault credentials stored by the vault server. The computer program product comprises a computer readable storage medium having program instructions embodied therewith, the program instructions executable by a computing device to cause the computing device to: receive a vault access request for the vault credentials stored by the vault server; verify whether a source of the vault access request originated from a multitenant application server; prevent access to the vault server and the vault credentials when the source of the vault access request has not been verified as originating from the multitenant application server; and obtain vault credentials from a vault server and provide the vault credentials to the multitenant application server based on verifying that the source of the vault access request originated from the multitenant application server.

In an aspect of the invention a system comprises: a CPU, a computer readable memory and a computer readable storage medium associated with a computing device; program instructions to receive an application instruction and a vault access request for vault credentials stored by a vault server; program instructions to determine that the vault access request was received from a multitenant application server; program instructions to obtain vault credentials from a vault server based on determining that the vault access request was received from the multitenant application server; and program instructions to execute a multitenant application task using the vault credentials in accordance with the application instruction. Executing the multitenant application task includes accessing one or more client devices using the vault credentials. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to controlling access to a vault server and, more particularly, to controlling access to a vault server residing on a client network outside of a service provider network in a multitenant environment. As described herein, a multitenant application server residing within a service provider network may access a vault server residing within a client network. For example, the multitenant application server may access the vault server to receive credentials used to access a client server (e.g., to perform a task on the client server, such as remediating an error using a virtual engineer). Additionally, or alternatively, the multitenant application server may access the vault server for another purpose (e.g., to manage files stored by the file fault server). The multitenant application server may request access to the vault via a jump host server residing in the client network. For example, the multitenant application server may provide credentials (e.g., user identifier, password, script, hash value, execution location information, etc.) to the jump host server, and the jump host server may provide access to the vault server upon verification of the credentials. Since the vault resides on the client network and is outside of the service provider network, a user within the client network (e.g., a "root user," a "super user," a "super administrator", etc.) may access the vault server. Aspects of the present invention may reduce or eliminate a security risk in which unauthorized users within the client network may access the vault. For example, accessing the vault server by an entity other than the multitenant application server may pose a security risk and/or may comprise the functionality of a multitenant application hosted by the multitenant application server.

Aspects of the present invention provide a security module that verifies that a request to access a vault server originates from a multitenant application server (e.g., as opposed to from another source, such as a root user). As a result, the vault server may only be accessed by the multitenant application server and protected from being accessed by a user or other entity. Advantageously, security of the vault server and its contents may be improved.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
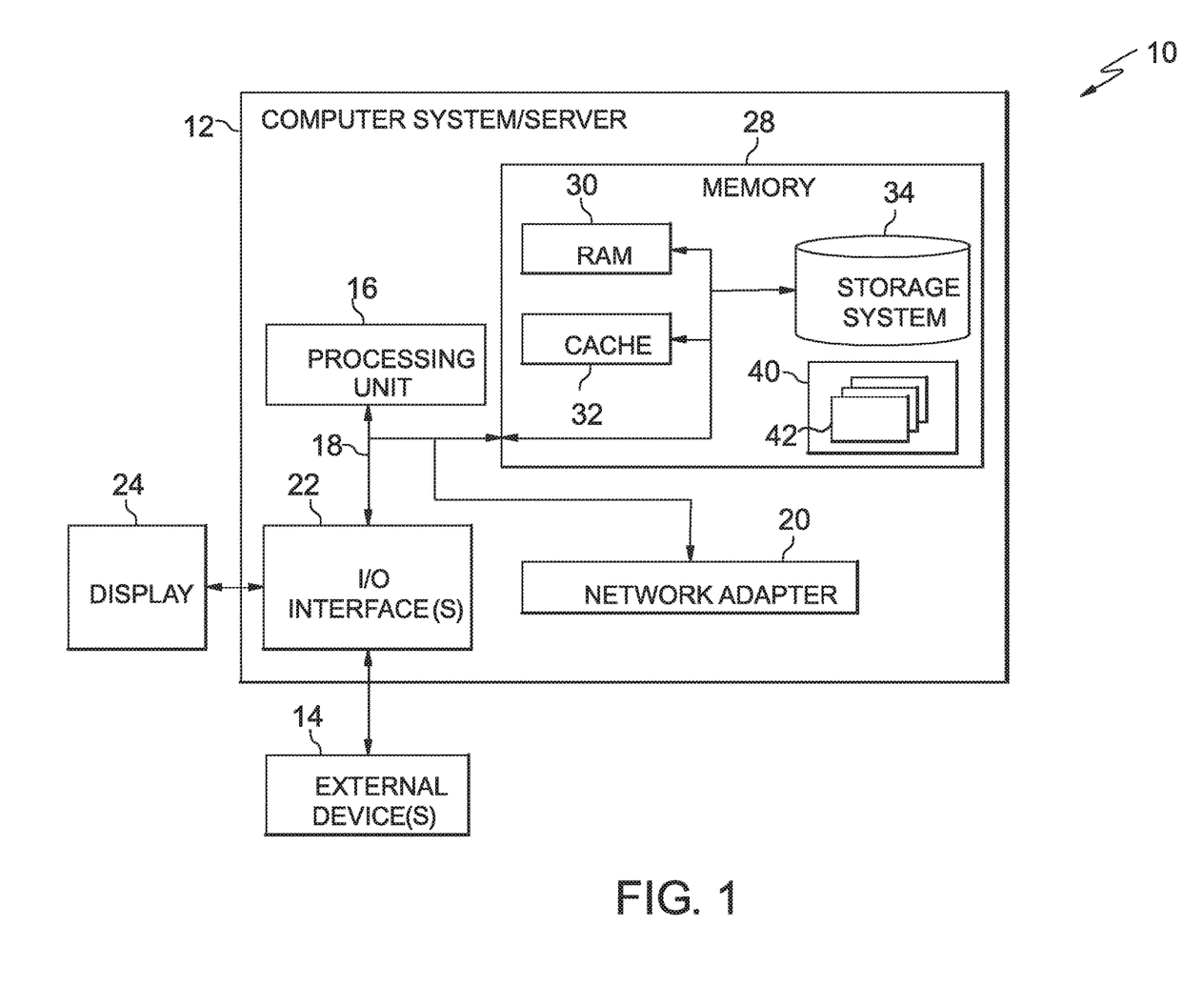
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
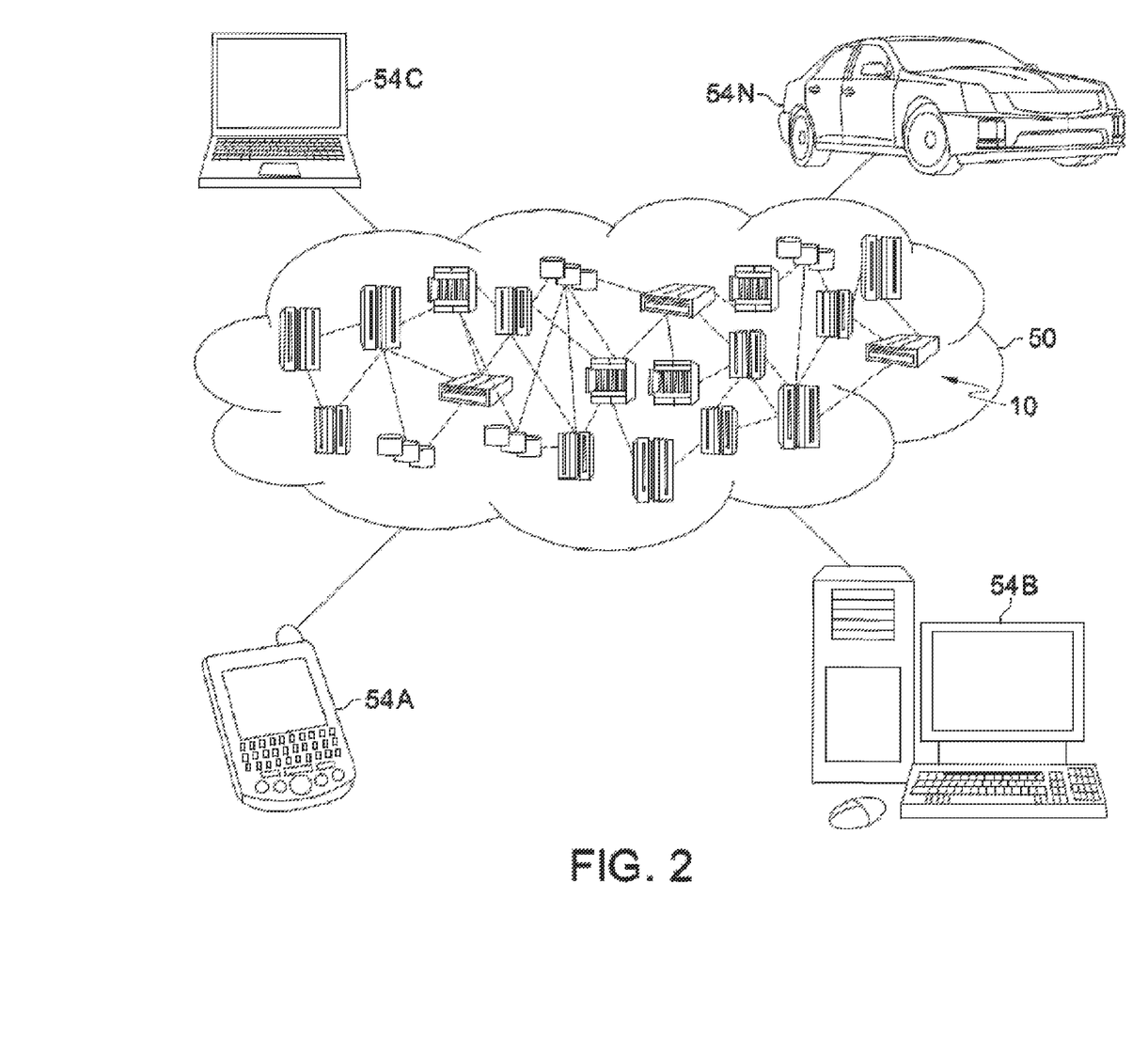
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
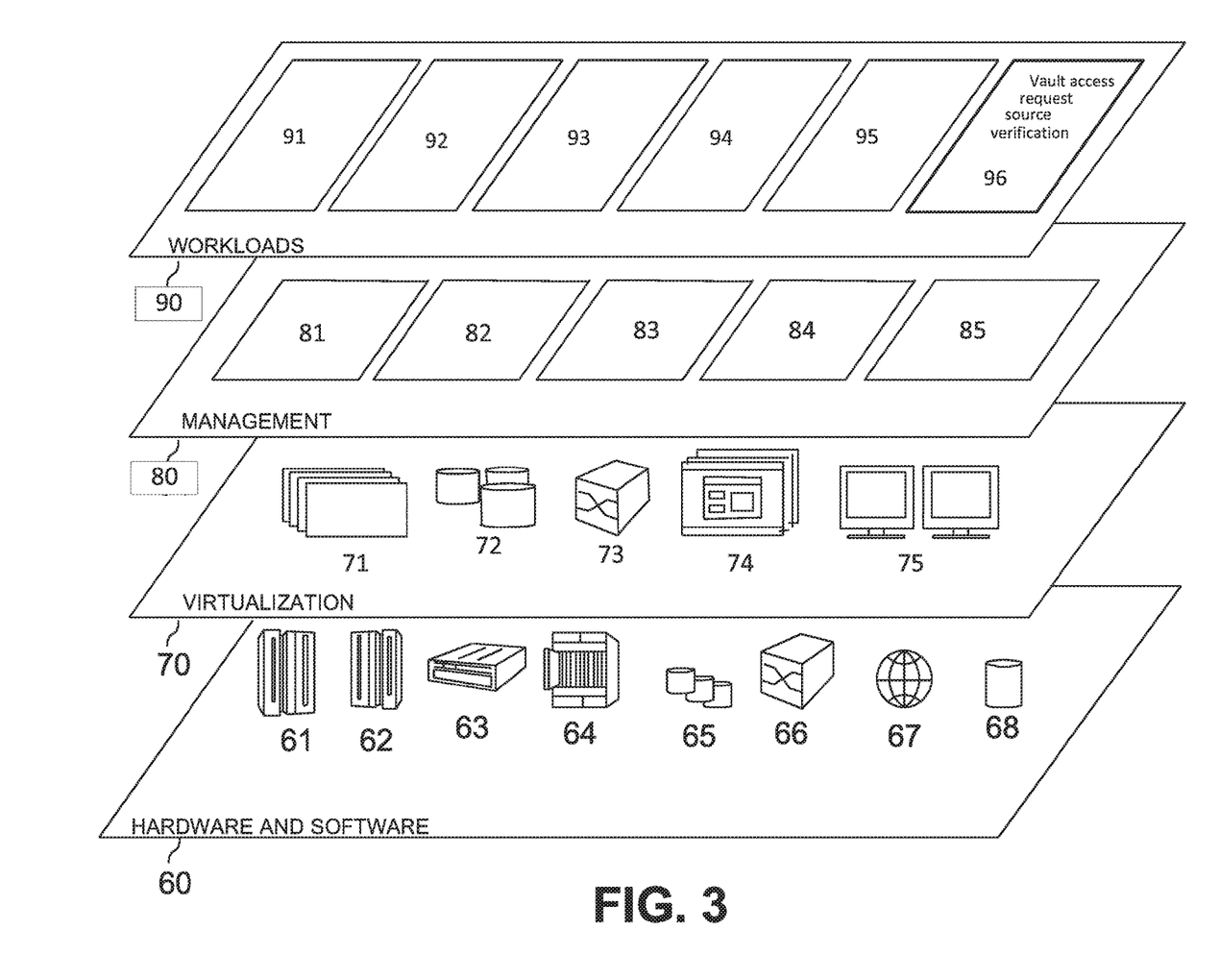
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vault access request source verification 96.

Referring back to FIG. 1, the program/utility 40 may include one or more program modules 42 that generally carry out the functions and/or methodologies of embodiments of the invention as described herein (e.g., such as the functionality provided by vault access request source verification 96). Specifically, the program modules 42 may receive a vault access request, verify the source of the vault access request, and obtain vault credentials stored by a vault server based on verifying that the vault access request originated from a multitenant application server. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a jump host server as shown in FIG. 4.

Figure 4:
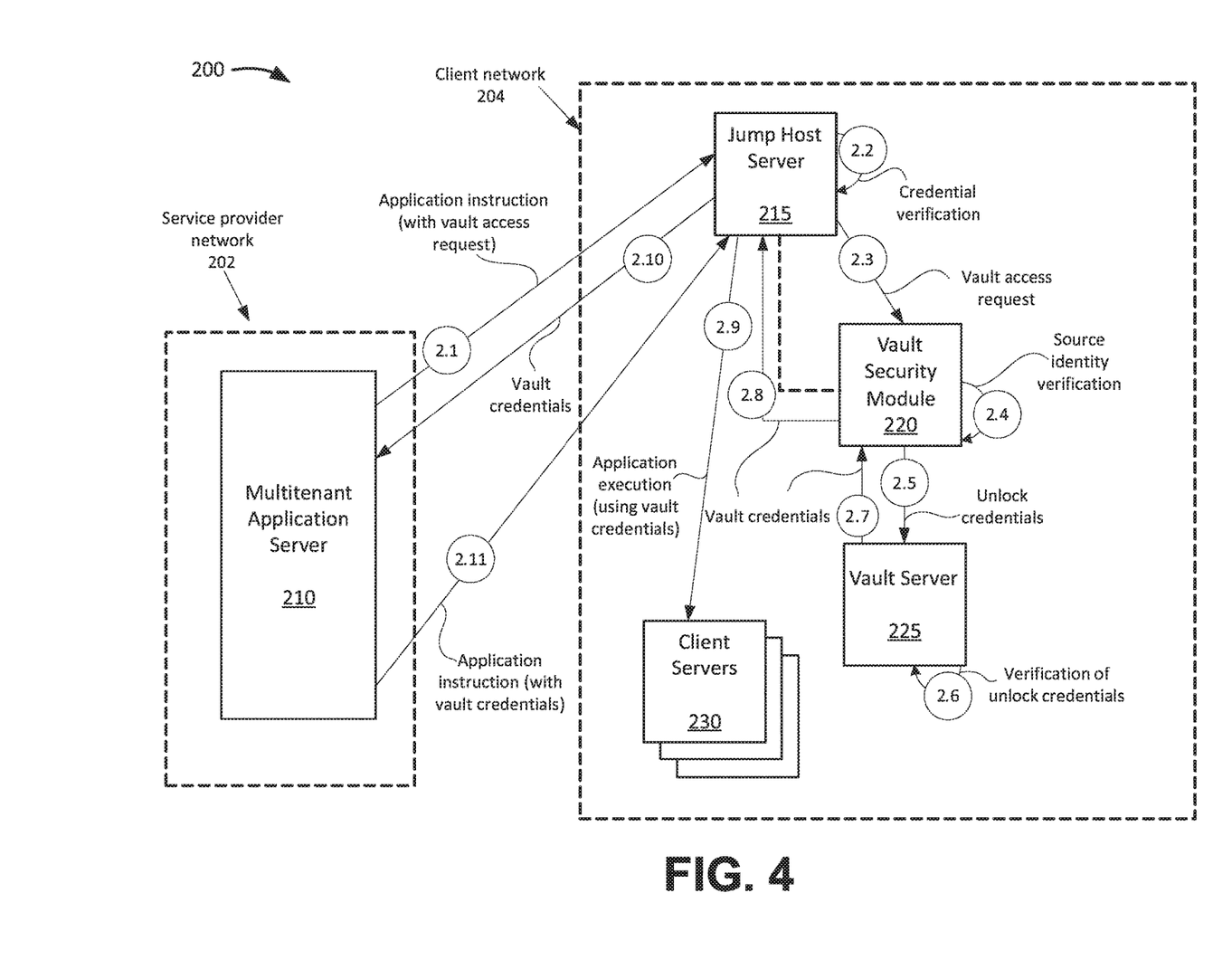
FIG. 4 shows an overview of an example implementation in accordance with aspects of the present invention.

FIG. 4 shows an overview of an example implementation in accordance with aspects of the present invention. As shown in FIG. 4, environment 200 may include a service provider network 202 and a client network 204. The service provider network 202 may include a multitenant application server 210. The client network 204 may include a jump host server 215, a vault server 225, and client servers 230.

The multitenant application server 210 may include one or more server devices that implement a multitenant application. In embodiments, the multitenant application server 210 may include one or more components of the computer system/server 12 of FIG. 1.

The jump host server 215 may include one or more server devices that provide the multitenant application server 210 with access to the vault server 225. In embodiments, the jump host server 215 may include one or more components of the computer system/server 12 of FIG. 1. The jump host server 215 may include a vault security module 220 that verifies a source of a request to access the vault server 225. The vault security module 220 may include one more program modules 42 of FIG. 1.

The vault server 225 may include one or more server devices that store files that may be accessed by the multitenant application server 210. For example, the vault server 225 may store credentials that the multitenant application server 210 may use to access client servers within the client network 204 (as described in greater detail below with respect to FIG. 5). In embodiments, the vault server 225 may include one or more components of the computer system/server 12 of FIG. 1.

The client servers 230 may include one or more server devices that implement services or applications within the client network 204. In embodiments, the client servers 230 may include one or more components of the computer system/server 12 of FIG. 1. Access to client servers 230 may be protected by credentials stored by the vault server 225.

In embodiments, the service provider network 202 and the client network 204 may communicate via an intermediate network which may include one or more wired and/or wireless networks. For example, the intermediate network may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the intermediate network may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

As shown in FIG. 4, at step 2.1, the multitenant application server 210 may provide an application instruction to the jump host server 215. For example, the application instruction may include instructions relating to the execution of a multitenant application task in which client servers 230 are accessed to remediate an error. Additionally, or alternatively, the application instruction may relate to another type of application. As described herein, access to client servers 230 may be needed in order to execute the application instructions. Access to the client servers 230 may be protected by vault credentials stored by the vault server 225. Accordingly, the application instructions may include a request to access the vault (e.g., so that vault credentials stored by the vault may be used to access the client servers 230 and, in turn, execute the application instructions). In embodiments, the vault access request may include credentials and authentication information for the multitenant application server 210 (e.g., a certificate and/or other type of authentication information). In embodiments, the application instructions and the vault access request may be provided via a secure channel or tunnel.

The jump host server 215 may receive the application instruction and the vault access request. At step 2.2, the jump host server 215 may verify the credentials included in the vault access request (e.g., to verify that the multitenant application server 210 is authorized to request the vault credentials). As described herein, the credentials included in the vault access request are different than the vault credentials stored by the vault server 225. More specifically, the credentials included in the vault access request may be used to verify that a request to access the vault credentials is received from an authorized party (e.g., an authorized multitenant application server 210).

At step 2.3 (e.g., after verifying the credentials of the vault access request), the vault access request is provided to the vault security module 220. At step 2.4, the vault security module 220 may verify the identity of the source of the vault access request. More specifically, the vault security module 220 may use the certificate included in the vault access request to verify that source of the vault access request is from the multitenant application server 210 (e.g., using a certificate-based authentication technique). Additionally, or alternatively, the vault security module 220 may use any other authentication technique, or combination thereof, to verify the identity of the source of the vault access request (e.g., hash value matching, encryption and decryption techniques, or the like). Additionally, or alternatively, the vault security module 220 may verify the identity of the source of the vault access request based on an internet protocol (IP) address from which the vault access request was received. Additionally, or alternatively, the vault security module 220 may verify the identity of the source of the vault access request based on a type of security protocol via which the vault access request was received.

At step 2.5, the vault security module 220 may provide unlock credentials to the vault server 225 to access the vault server 225 (e.g., based on verifying that the identity of the source of the vault access request is the multitenant application server 210). In other words, the vault security module 220 may provide unlock credentials to the vault server 225 based on verifying that the vault access request was received from the multitenant application server 210, and not from another source (e.g., a root user or super user that may request access to the vault server 225 via a vault access API). In this way, the vault server 225 cannot be accessed by a root user, as the source of the vault request must come from the multitenant application server 210.

As described herein, the unlock credentials may include a set of credentials that may be different than the credentials of the vault access request. Additionally, or alternatively, the unlock credentials may include a hash value, a script, user ID, execution location information, or the like. At step 2.6, the vault server 225 may verify the unlock credentials and may also authenticate the vault security module 220 to verify that the unlock credentials originated from the vault security module 220 (e.g., using hash value verification and/or other techniques). At step 2.7, the vault server 225 may provide the vault credentials stored by the vault server 225 to the vault security module 220. At step 2.8, the vault security module 220 may provide the vault credentials to the jump host server 215. At step 2.9, the jump host server 215 may execute the application instruction using the vault credentials. For example, the jump host server 215 may use the vault credentials to access the client servers 230 as part of the application execution. As an illustrative, non-limiting example, the jump host server 215 may execute an application to remediate a problem on the client servers 230. Accordingly, the jump host server 215 may use the vault credentials to access the client servers 230 in order to remediate the problem in accordance with the application instructions. Alternatively, the jump host server 215 may use the vault credentials to access the client servers 230 in order to perform another task in accordance with the application instructions.

At step 2.10, the jump host server 215 may provide the vault credentials to the multitenant application server 210. The multitenant application server 210 may store the vault credentials for future use. For example, at step 2.11, the multitenant application server 210 may provide an application instruction (e.g., via a secure channel) to the jump host server 215 in which the application instruction includes the vault credentials. Based on receiving the vault credentials, the jump host server 215 may execute the application using the vault credentials (e.g., in a similar manner as discussed above with respect to step 2.9).

The quantity of devices and/or networks in the environment 200 is not limited to what is shown in FIG. 4. In practice, the environment 200 may include additional devices and/or networks; fewer devices and/or networks; different devices and/or networks; or differently arranged devices and/or networks than illustrated in FIG. 4. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 5:
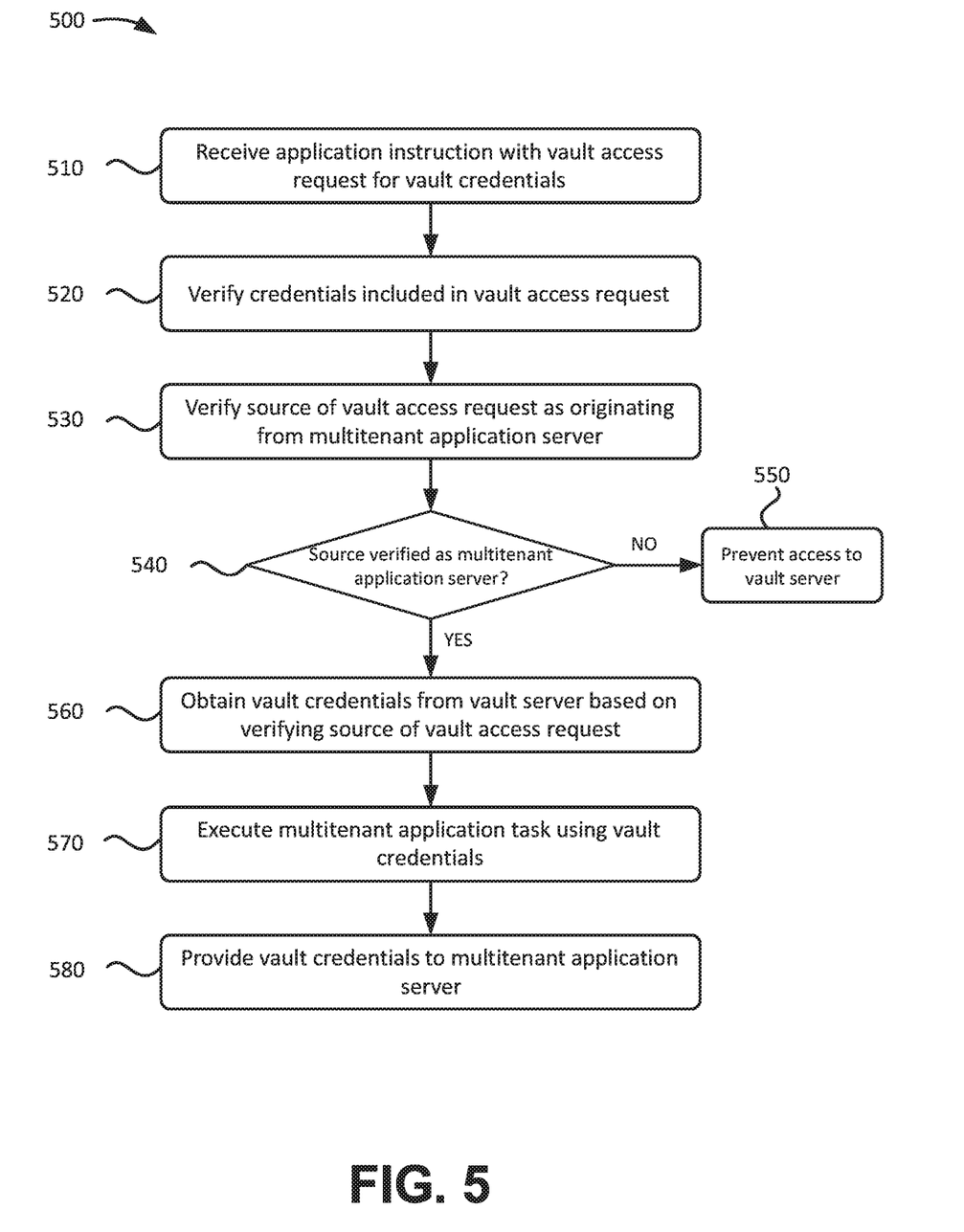
FIG. 5 shows an example flowchart for verifying the source of a vault access request in accordance with aspects of the present invention.

FIG. 5 shows an example flowchart for verifying the source of a vault access request in accordance with aspects of the present invention. The steps of FIG. 5 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 5, process 500 may include receiving an application instruction with a vault access request for vault credentials (step 510). For example, the jump host server 215 may receive an application instruction with a vault access request for vault credentials stored by the vault server 225 (e.g., in a similar manner as described above with respect to step 2.1 of FIG. 4). In embodiments, a multitenant application server 210 may provide the application instruction. The application instruction may include a request for the jump host server 215 to execute a multitenant application task within the client network 204 and by communicating with particular client servers 230 as required by the multitenant application. The multitenant application server 210 may also provide the vault access request if the multitenant application server 210 is not currently storing vault credentials used to access client devices 230 that may need to be accessed in connection with execution of the application instruction. As described herein, the vault access request may include a set of credentials, a certificate, and/or other information that may be verified in order to process the vault access request.

Process 500 may also include verifying credentials included in the vault access request (step 520). For example, the jump host server 215 may verify the credentials included in the vault access request (e.g., in a similar manner as described above with respect to step 2.2 of FIG. 4).

Process 500 may further include verifying the source of the vault access request as originating from a multitenant application server (step 530). For example, the vault security module 220 of the jump host server 215 may verify the source of the vault access request as originating from the multitenant application server 210 (e.g., in a similar manner as described above with respect to step 2.4 of FIG. 4). More specifically, the vault security module 220 may use the certificate included in the vault access request to verify that the vault access request was received from the multitenant application server 210 (e.g., using a certificate-based authentication technique). Additionally, or alternatively, the vault security module 220 may use any other authentication technique, or combination thereof, to verify the identity of the source of the vault access request (e.g., hash value matching, encryption and decryption techniques, or the like). Additionally, or alternatively, the vault security module 220 may verify the identity of the source of the vault access request based on an internet protocol (IP) address from which the vault access request was received. Additionally, or alternatively, the vault security module 220 may verify the identity of the source of the vault access request based on.

As described herein, the vault security module 220 may verify that the vault access request was received from the multitenant application server 210, and not from another source (e.g., a root user or super user that may request access to the vault server 225 via a vault access API). In this way, the vault server 225 cannot be accessed by a root user, as the source of the vault request must come from the multitenant application server 210. For example, if, at step 540, the source of the vault access request has not been verified as the multitenant application server 210, process 500 may include preventing access to the vault server 225 (step 550). In embodiments, the vault security module 220 may prevent access to the vault server 225 and may not provide the unlocked credentials if the source of the vault access request has not been verified as the multitenant application server 210, or if the vault access request has been determined to have originated from a source other than the multitenant application server 210. In embodiments, the vault security module 220 may discard the request and/or provide an alert to an administer device indicating an attempt to access the vault server 225 by a source other than the multitenant application server 210.

If, at step 540, the source of the vault access request has been verified as the multitenant application server 210, process 500 may also include obtaining vault credentials from a vault server based on verifying the source of the vault access request (step 560). For example, the vault security module 220 of the jump host server 215 may obtain the vault credentials by providing unlocked credentials to the vault server 225 based on verifying the source of the vault access request (e.g., in a similar manner as described above with respect to step 2.5 of FIG. 4). More specifically, the vault security module 220 may provide the unlock credentials based on verifying that the vault access request originated from the multitenant application server 210. The vault server 225 may receive verify the unlock credentials and may also authenticate the vault security module 220 to verify that the unlock credentials originated from the vault security module 220 (e.g., as described above with respect to step 2.6 of FIG. 4). Further, the vault server 225 may provide the vault credentials to the vault security module 220, and the vault security module 220 may receive the vault credentials stored by the vault server 225 (e.g., in a similar manner as described above with respect to step 2.7 of FIG. 4). In embodiments, the vault security module 220 may provide the vault credentials to another component of the jump host server 215 (e.g., an application execution component, or the like).

Process 500 may further include executing a multitenant application task using the vault credentials (step 570). For example, the jump host server 215 may execute the multitenant application task (e.g., in accordance with the application instruction of step 510) using the vault credentials (e.g., by accessing the client servers 230 as required by the execution of the multitenant application).

Process 500 may also include providing the vault credentials to the multitenant application server (block 580). For example, the jump host server 215 may provide the vault credentials to the multitenant application server 210 (e.g., in a similar manner as described above with respect to step 2.10). Based on receiving the vault credentials, the multitenant application server 210 may store the vault credentials for future use, as described herein.

Figure 6:
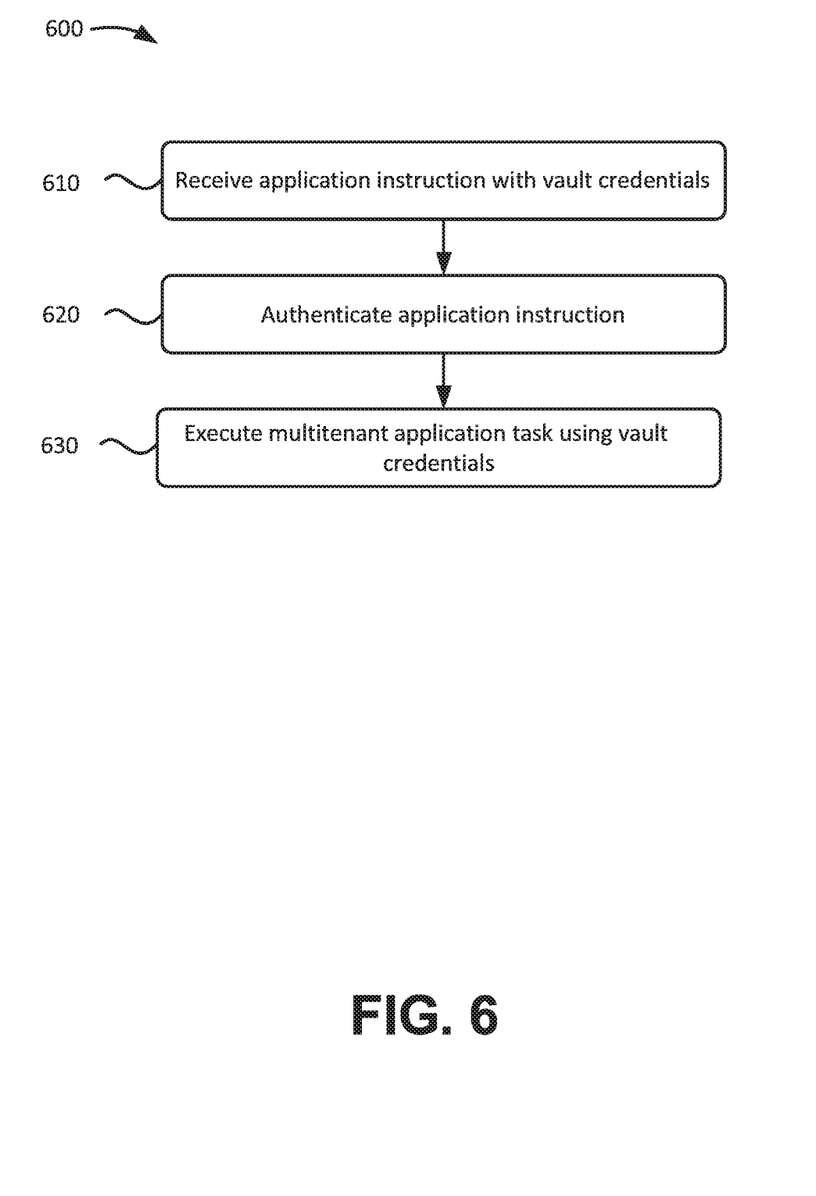
FIG. 6 shows an example flowchart for executing a multitenant application task after processing a vault access request originating from a multitenant application server in accordance with aspects of the present invention.

FIG. 6 shows an example flowchart for executing a multitenant application after processing a vault access requested originating from a multitenant application server in accordance with aspects of the present invention. The steps of FIG. 6 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 6, process 600 may include receiving an application instruction with vault credentials (block 610). For example, the jump host server 215 may receive an application instruction with vault credentials from the multitenant application server 210 (e.g., in a similar manner as described above with respect to step 2.11). As described herein, the application instruction may include a request for the jump host server 215 to execute a multitenant application within the client network 204 and by communicating with particular client servers 230 as required. As described herein, multitenant application server 210 may provide vault credentials used to access the client servers 230 in connection with executing the multitenant application task when the multitenant application server 210 previously receives the vault credentials from the jump host server 215 (e.g., as described with respect to step 2.10 of FIG. 4 and step 550 of FIG. 5).

Process 600 may further include authenticating the application instruction (step 620). For example, the jump host server 215 may authenticate the application instruction to verify that the application instruction originated from the multitenant application server 210. In embodiments, the jump host server 215 may authenticate the application instruction using one or more authentication techniques. Process 600 may also include executing the multitenant application task using the vault credentials (step 630). For example, the jump host server 215 may execute the multitenant application task in accordance with the application instruction (e.g., by accessing the client servers 230 using the vault credentials as required by the execution of the multitenant application task). In this way, the multitenant application server 210 may direct jump host server 215 to execute a multitenant application task without the need to access the vault server 225, as multitenant application server 210 has previously received and stored the vault credentials (e.g., as described above with respect to the process of FIG. 5). That is, the multitenant application server 210 may direct jump host server 215 to execute a multitenant application task without additional involvement from the vault server 225.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device implemented in a client network, a vault access request for vault credentials stored by a vault server implemented in the client network, the vault credentials being required to access one or more client servers in the client network;
verifying, by the computing device, that the vault access request includes credentials that a party requesting the vault credentials is an authorized party;
verifying, by the computing device, whether a source of the vault access request originated from a multitenant application server which is implemented in a service provider network which is separate from the client network;
preventing, by the computing device, access to the vault server and the vault credentials when the source of the vault access request has not been verified as originating from the multitenant application server;
obtaining, by the computing device, vault credentials from the vault server based on verifying that the source of the vault access request originated from the multitenant application server;
executing, by the computing device, a multitenant application task using the vault credentials to access the one or more client servers; and
storing, at the multitenant application server, the vault credentials obtained from the vault server, wherein the multitenant application server uses the vault credentials to execute a multitenant application task without having to access the vault server,
wherein the computing device in the client network is comprised of a jump host server configured to connect the multitenant application server in the service provider network with the vault server and the one or more client servers implemented in the client network, and
wherein the jump host server is configured to verify the vault credentials.

2. The method of claim 1, wherein the verifying whether the source of the vault access request originated from a multitenant application server is performed by a vault security module coupled between the jump host server and the vault server.

3. The method of claim 1, wherein the vault access request includes authentication information used to verify the source of the vault access request.

4. The method of claim 3, wherein:
the authentication information includes a certificate, and
the verifying whether the source of the vault access request originated from a multitenant application server is based on at least one of:
certificate-based authentication;
hash value matching;
encryption or decryption;
an internet protocol (IP) address via which the vault access request is received; and
a type of security protocol via which the vault access request is received.

5. The method of claim 1, further comprising receiving an application instruction as part of the vault access request.

6. The method of claim 5, wherein executing the multitenant application task includes executing the multitenant application task in accordance with the application instruction.

7. The method of claim 6, wherein executing the multitenant application task includes accessing one or more client servers using the vault credentials.

8. The method of claim 1, further comprising providing the vault credentials to the multitenant application server.

9. The method of claim 8, further comprising:
receiving an application instruction including the vault credentials from the multitenant application server after executing the multitenant application task; and
executing an additional multitenant application task using the vault credentials included in the application instruction.

10. The method of claim 9, wherein the additional multitenant application task is executed without additional involvement of the vault server.

11. The method of claim 1, wherein a service provider at least one of creates, maintains, deploys and supports the computing device.

12. The method of claim 1, wherein steps of claim 1 are provided by a service provider on a subscription, advertising, and/or fee basis.

13. The method of claim 1, wherein the computing device includes software provided as a service in a cloud environment.

14. The method of claim 1, further comprising deploying a system for controlling access to the vault server and the vault credentials, comprising providing a computer infrastructure that includes program instructions operable to perform the steps of claim 1.

15. A computer program product for controlling access to a vault server implemented in a client network, including one or more client servers, and vault credentials stored by the vault server, the computer program product comprising a computer readable storage medium having program instructions embodied therewith, the program instructions executable by a computing device to cause the computing device to:
receive, by a jump host server in the client network, a vault access request for the vault credentials stored by the vault server, the vault credentials being required to access the one or more client servers in the client network;
verify that the vault access request includes credentials that a party requesting the vault credentials is an authorized party;
verify, by the jump host server, whether a source of the vault access request originated from a multitenant application server which is coupled to the jump host server and which is implemented in a service provider network which is separate from the client network;
prevent access, by the jump host server, to the vault server and the vault credentials when the source of the vault access request has not been verified as originating from the multitenant application server;
obtain vault credentials from a vault server, by the jump host server, and provide the vault credentials, by the jump host server, to the multitenant application server based on verifying that the source of the vault access request originated from the multitenant application server to allow the multitenant application server to access the one or more client servers; and
store, at the multitenant application server, the vault credentials obtained from the vault server, wherein the multitenant application server uses the vault credentials to execute a multitenant application task without having to access the vault server.

16. The computer program product of claim 15, wherein verifying whether a source of the vault access request originated from a multitenant application server is performed by the jump host server using a vault security module coupled to the jump host server and implemented within the client network.

17. The computer program product of claim 15, wherein the program instructions further cause the computing device to execute a multitenant application task using the vault credentials in accordance with an application instruction received from the multitenant application server.

18. A system comprising:
a CPU, a computer readable memory and a computer readable storage medium associated with a computing device;
program instructions to receive an application instruction and a vault access request for vault credentials stored by a vault server;
program instructions to verify by a jump host server, connected to the vault server, a multitenant application server and client servers, that the vault access request includes credentials that a party requesting the vault credentials is an authorized party;
program instructions to determine that the vault access request was received from the multitenant application server;
program instructions to obtain the vault credentials from the vault server based on determining that the vault access request was received from the multitenant application server;
program instructions to verify the vault credentials by the jump host server;
program instructions to execute a multitenant application task using the vault credentials in accordance with the application instruction; and
program instructions to store, at the multitenant application server, the vault credentials obtained from the vault server, wherein the multitenant application server uses the vault credentials to execute a multitenant application task without having to access the vault server,
wherein the executing the multitenant application task includes accessing one or more of the client servers using the vault credentials, and
wherein the program instructions are stored on the computer readable storage medium for execution by the CPU via the computer readable memory.

19. The system of claim 18, wherein the determining that the vault access request was received from a multitenant application server is based on at least one of:
certificate-based authentication;
hash value matching;
encryption or decryption;
an internet protocol (IP) address via which the vault access request is received; and
a type of security protocol via which the vault access request is received.

20. The system of claim 18, wherein the determining whether the source of the vault access request originated from a multitenant application server is performed by a vault security module coupled between the jump host server and the vault server.

* * * * *